(12) United States Patent
Xiao et al.

(10) Patent No.: US 11,832,233 B2
(45) Date of Patent: *Nov. 28, 2023

(54) SIGNALING TRANSMITTING AND RECEIVING METHODS, DEVICE, NETWORK-SIDE DEVICE, TERMINAL AND STORAGE MEDIUM

(71) Applicant: ZTE CORPORATION, Shenzhen (CN)

(72) Inventors: Huahua Xiao, Shenzhen (CN); YuNgok Li, Shenzhen (CN); Jian Li, Shenzhen (CN); Yijian Chen, Shenzhen (CN); Xiao Yan, Shenzhen (CN); Hao Wu, Shenzhen (GD); Yong Li, Shenzhen (CN); Jianxing Cai, Shenzhen (CN); Zhaohua Lu, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

This patent is subject to a terminal disclaimer.

(21) Appl. No.: 17/194,898

(22) Filed: Mar. 8, 2021

(65) Prior Publication Data

US 2021/0195595 A1    Jun. 24, 2021

Related U.S. Application Data (63) Continuation of application No. 16/097,501, filed as application No. PCT/CN2017/080146 on Apr. 11, 2017, now Pat. No. 10,980,032.

(30) Foreign Application Priority Data

Apr. 29, 2016 (CN) .......................... 201610289895.4

(51) Int. Cl.
*H04B 7/216* (2006.01)
*H04W 72/044* (2023.01)
(Continued)

(52) U.S. Cl.
CPC ....... *H04W 72/0466* (2013.01); *H04L 5/0048* (2013.01); *H04W 28/06* (2013.01); *H04W 72/542* (2023.01)

(58) Field of Classification Search
CPC ............. H04W 72/0466; H04W 28/16; H04W 72/085; H04W 72/542; H04L 5/0048
See application file for complete search history.

(56) References Cited

U.S. PATENT DOCUMENTS 10,980,032 B2 *  4/2021  Xiao ................... H04W 28/16
2014/0192734 A1 *  7/2014  Ng ........................ H04L 5/0035
370/329

(Continued)

*Primary Examiner* — Siren Wei
(74) *Attorney, Agent, or Firm* — BOND SCHOENECK & KING, PLLC (57) ABSTRACT

Provided is signaling transmitting and receiving methods, device, network-side device, terminal and storage medium. The signaling transmitting method includes: determining a first parameter set and/or a second parameter set for N resource groups; and transmitting an indication signaling, the indication signaling carries indication information for indicating the first parameter set and/or the second parameter set. The signaling receiving method includes: receiving an indication signaling transmitted by a network-side device. The indication signaling carries indication information for indicating a first parameter set and/or a second parameter set determined by the network-side device for N resource groups. The first parameter set is a Physical Downlink Shared Channel Resource Element (PDSCH RE) mapping set. The second parameter set is a Quasi-Co-Location (QCL) parameter set. N is a positive integer greater than 1.

20 Claims, 2 Drawing Sheets

(51) Int. Cl.
*H04W 28/06* (2009.01)
*H04W 72/542* (2023.01)
*H04L 5/00* (2006.01)

(56) References Cited

U.S. PATENT DOCUMENTS

2015/0215905 A1* 7/2015 Park .................. H04L 5/0048
370/329
2015/0257130 A1* 9/2015 Lee .................... H04L 5/0092
370/336
2016/0248561 A1* 8/2016 Davydov ............ H04B 7/0413

* cited by examiner

FIG. 1

Determine a first parameter set and/or a second parameter set for N resource groups, where N is a positive integer greater than 1, the first parameter set is a PDSCH RE mapping set and the second parameter set is a QCL parameter set — S202

Transmit an indication signaling, where the indication signaling carries indication information for indicating the first parameter set and/or the second parameter set — S204

SIGNALING TRANSMITTING AND RECEIVING METHODS, DEVICE, NETWORK-SIDE DEVICE, TERMINAL AND STORAGE MEDIUM

CROSS-REFERENCE TO RELATED APPLICATIONS

This application is a Continuation Application of the U.S. application Ser. No. 16/097,501 filed Oct. 29, 2018 which is the National Phase of PCT application number PCT/CN2017/080146 having a PCT filing date of Apr. 11, 2017, which claims priority of Chinese patent application No. 201610289895.4 filed on Apr. 29, 2016, the disclosures of which are hereby incorporated by reference.

TECHNICAL FIELD

The present disclosure relates to the field of communications and, in particular, to signaling transmitting and receiving methods, device, network-side device, terminal and storage medium.

BACKGROUND

In a Long Term Evolution (LTE)/Long Term Evolution-Advanced (LTE-A) system, when multi-point transmission is supported, since a base station for data transmission is transparent to a terminal and can be dynamically switched, the terminal cannot accurately know that received data is transmitted by which base station. Therefore, the definition of a Quasi-Co-Location (QCL) indicator and a notification signaling are introduced.

The QCL indicator represents that a Channel State Information Reference Signal (CSI-RS) transmitted and notified by current data and a CSI-RS transmitted and notified by a Ue specific de-Modulation Reference Signal have a quasi-co-location relationship. The CSI-RSs transmitted and notified by these two have approximate the same large-scale characteristics of the channel, such as a delay spread, Doppler spread, Doppler shift and average delay. The QCL may be understood as the current data and the DMRS being approximately transmitted by one base station.

After obtaining the CSI-RS or a Cell specific Reference Signal (CRS) which has a quasi-co-location relationship with the DMRS, the terminal can obtain, according to the obtained reference signal, some statistical characteristic parameters of the channel from the base station to the terminal in advance in the course of channel demodulation. Therefore, the terminal can effectively use these statistical characteristic parameters to improve the estimation accuracy with a demodulation pilot and the performance of a receiver, and effectively suppress noises, and also may apply the statistical characteristic parameters to different estimation algorithms and receiving algorithms.

In addition, when the base station emits signals, the non-ideal devices cause frequency offset and time offset errors. The terminal may obtain estimate values of the frequency offset and time offset according to the CSI-RS or CRS measurement, and transmit the estimation values of the frequency offset and time offset to facilitate the calibration performed by the base station. It is to be noted that only reference signals transmitted by a same base station can accurately measure these statistical characteristics of the channel. That is, the measurement of these statistical characteristic parameters is generally directed to the reference signals transmitted by the same base station. So the terminal needs the QCL indicator to know which CSI-RS or CRS has the quasi-co-location relationship with the DMRS.

In 3GPP TS 36.213 standards, the QCL indicator is jointly notified with relevant information of a Physical Downlink Shared Channel Resource Element mapping. Table 1 provides meanings of various statuses of a Physical Downlink Shared Channel Resource Element mapping and Quasi-Co-Location Indicator signaling.

TABLE 1

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

As shown in table 1, in the PDSCH RE Mapping and Quasi-Co-Location Indicator field, a physical layer Downlink Control Information of 2 bit is used for dynamically indicating four parameter sets. Each set includes a group of parameters which includes the following multiple types of information:
configuration parameter information of the CRS, including the number of ports and a frequency domain shift parameter;
subframe configuration parameter information of a Multimedia Broadcast multicast service Single Frequency Network (MBSFN);
parameter configuration information of a Zero Power (ZP) CSI-RS;
configuration information of a data channel starting symbol parameter; and
information of a quasi-co-location Non-Zero Power (NZP) CSI-RS.

In a process of the base station transmitting data to the terminal, the base station, which transmits the data, may be switched dynamically. The RE mapping and the changing of the quasi-co-location of the reference signal and the data transmission can achieved by dynamically indicating the above-mentioned information through the signaling of 2 bits.

Figure 1:
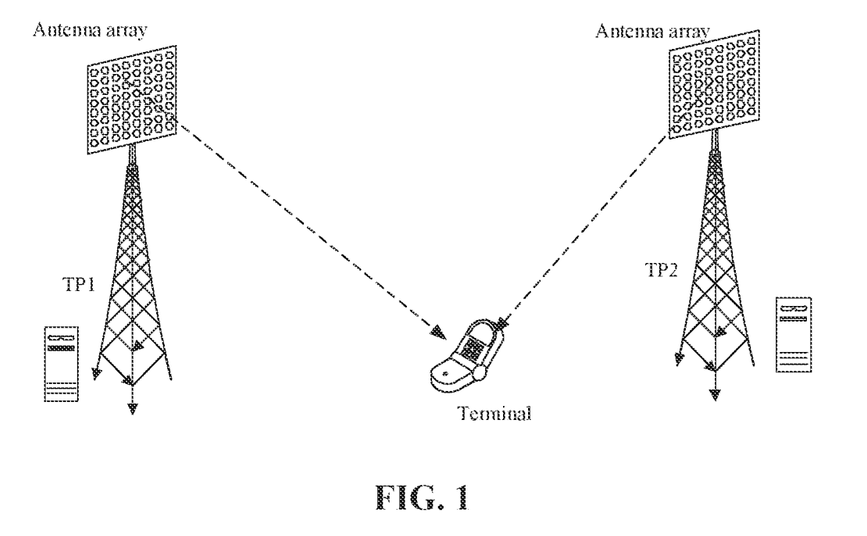
FIG. 1 is a schematic diagram illustrating that two transmission nodes performs a joint transmission for one user in the related art.

With the development of technologies, coordinated multipoint transmission has become an important technology to improve the spectrum efficiency of the system. The joint transmission (JT) in the coordinated multi-point transmission has also been developed and enhanced. In the related art, all codeword streams of multiple transmission points of the joint transmission for the same terminal, all quasi-co-location indicators and/or resource element mappings of all time-frequency resources within a whole system bandwidth are the same. FIG. 1 is a schematic diagram illustrating that two transmission nodes performs a joint transmission for one user in the related art. As shown in FIG. 1, the two transmission nodes TP1 and TP2 transmit data to the user on the same time-frequency resources.

In the related art, the DCI of data 1 transmitted by the TP1 to the user and the DCI of data 2 transmitted by the TP2 to the user are the same and have the same value of the quasi-co-location indicator and PDSCH RE Mapping notification signaling, which indicate the same QCL parameter configuration set and PDSCH RE mapping relationship and enable to perform data de-modulation in a same DMRS estimation channel. This will not well reflect channel conditions of the data transmitted by different TPs. The channel measurement performed on the same CSI-RS/CRS also cannot well reflect the channel conditions of the different TPs, thereby causing a performance degradation. On the other hand, especially in a heterogeneous network, the TP1 and TP2 may have different system bandwidths, which only partially overlap with each other. In the related art, the same Quasi-co-location parameters or PDSCH RE mapping parameters configured on different time-frequency resources may cause difficulty in PDSCH RE mapping. Similarly, the same QCL parameters may also cause performance degradation. Also, in the same applies to other technologies of the coordinated multi-point transmission, including Coordinated Scheduling/Beamforming (CS/CB), Dynamic point selection (DPS) and Dynamic cell selection (DCS).

SUMMARY

Embodiments of the present disclosure provide signaling transmitting and receiving methods, device, network-side device, terminal and storage medium to improve the performance in joint transmission of coordinated multi-point transmission caused by the Physical Downlink Shared Channel Resource Element and/or Quasi-Co-Location Indicator in the related art.

A signaling transmitting method is provided according to an embodiment of the present disclosure. The method includes: determining a first parameter set and/or a second parameter set for N resource groups, where N is a positive integer greater than 1, the first parameter set is a Physical Downlink Shared Channel Resource Element (PDSCH RE) mapping set, the second parameter set is a Quasi-Co-Location (QCL) parameter set; and transmitting an indication signaling, where the indication signaling carries indication information for indicating the first parameter set and/or the second parameter set.

In one implementation mode, the N resource groups are obtained by dividing according to at least one of the following resources: a transmission block (TB), a codeword, a de-Modulation Reference Signal (DMRS) port group, a transport layer group (LG) and frequency domain location information.

In one implementation mode, one transmission block corresponds to one resource group of the N resource groups, or one codeword corresponds to one resource group of the N resource groups, or one DMRS port group corresponds to one resource group of the N resource groups, or one transport layer group corresponds to one resource group of the N resource groups or one piece of frequency domain location information corresponds to one resource group of the N resource groups.

In one implementation mode, each resource group of the N resource groups corresponds to one first parameter set and/or second parameter set.

In one implementation mode, the DMRS port group includes one or more DMRS ports. The frequency domain location information includes at least one of resource block (RB) set information or sub-band set information.

In one implementation mode, the indication signaling includes N first downlink signalings. The N first downlink signalings are used for indicating N first parameter sets and/or second parameter sets determined for the N resource groups respectively.

In one implementation mode, when the N first parameter sets and the N second parameter sets are determined for the N resource groups, the N first parameter sets are same.

In one implementation mode, when the N first parameter sets and the N second parameter sets are determined for the N resource groups, the N second parameter sets are same.

In one implementation mode, the indication signaling includes one first downlink signaling. The first downlink signaling is used for indicating N first parameter sets and/or second parameter sets determined for the N resource groups.

In one implementation mode, the indication signaling includes one first downlink signaling and N−1 second downlink signaling. The one first downlink signaling is used for indicating one first parameter set and/or second parameter set of N first parameter sets and/or second parameter sets determined for the N resource groups. Each of the N−1 second downlink signalings is used to indicating one first parameter set or second parameter set of the N first parameter sets and/or second parameter sets determined for the N resource groups.

In one implementation mode, the first downlink signaling includes at least one signaling of a group consisting of: a high-layer signaling, a PDSCH RE mapping set and Quasi-Co-Location Indicator (PQI) signaling.

A signaling receiving method is provided according to another embodiment of the present disclosure. The method includes receiving an indication signaling transmitted by a network-side device. The indication signaling carries indication information for indicating a first parameter set and/or a second parameter set determined by the network-side device for N resource groups. The first parameter set is a Physical Downlink Shared Channel Resource Element (PDSCH RE) mapping set. The second parameter set is a Quasi-Co-Location (QCL) parameter set; and N is a positive integer greater than 1.

In one implementation mode, the N resource groups are obtained by dividing according to at least one of the following resources: a transmission block, a codeword, a de-Modulation Reference Signal (DMRS) port group, a transport layer group and frequency domain location information.

In one implementation mode, one transmission block corresponds to one resource group of the N resource groups, or one codeword corresponds to one resource group of the N resource groups, or one DMRS port group corresponds to one resource group of the N resource groups, or one transport layer group corresponds to one resource group of the N resource groups or one piece of frequency domain location information corresponds to one resource group of the N resource groups.

In one implementation mode, each resource group of the N resource groups corresponds to one first parameter set and/or second parameter set.

In one implementation mode, the DMRS port group includes one or more DMRS ports. The frequency domain location information includes at least one of resource block (RB) set information or sub-band set information.

In one implementation mode, the indication signaling includes N first downlink signalings. The N first downlink signalings are used for indicating N first parameter sets and/or second parameter sets determined for the N resource groups respectively.

In one implementation mode, when the N first parameter sets and the N second parameter sets are determined for the N resource groups, the N first parameter sets are same.

In one implementation mode, when the N first parameter sets and the N second parameter sets are determined for the N resource groups, the N second parameter sets are same.

In one implementation mode, the indication signaling includes one first downlink signaling. The first downlink signaling is used for indicating N first parameter sets and/or second parameter sets determined for the N resource groups.

In one implementation mode, the indication signaling includes one first downlink signaling and N−1 second downlink signaling. The one first downlink signaling is used for indicating one first parameter set and/or second parameter set of N first parameter sets and/or second parameter sets determined for the N resource groups. Each of the N−1 second downlink signalings is used to indicating one first parameter set or second parameter set of the N first parameter sets and/or second parameter sets determined for the N resource groups.

In one implementation mode, the first downlink signaling includes at least one signaling of a group consisting of: a high-layer signaling, a PDSCH RE mapping set and Quasi-Co-Location Indicator (PQI) signaling.

A signaling transmitting device is provided according to another embodiment of the present disclosure. The device includes: a determining module, which is configured to determine a first parameter set and/or second parameter set for N resource groups, where N is a positive integer greater than 1, the first parameter set is a Physical Downlink Shared Channel Resource Element (PDSCH RE) mapping set, the second parameter set is a quasi-co-location (QCL) parameter set; and a transmitting module, which is configured to transmit an indication signaling, where the indication signaling carries indication information for indicating the first parameter set and/or the second parameter set.

In one implementation mode, the N resource groups are obtained by dividing according to at least one of the following resources: a transmission block, a codeword, a de-Modulation Reference Signal (DMRS) port group, a transport layer group and frequency domain location information.

In one implementation mode, one transmission block corresponds to one resource group of the N resource groups, or one codeword corresponds to one resource group of the N resource groups, or one DMRS port group corresponds to one resource group of the N resource groups, or one transport layer group corresponds to one resource group of the N resource groups or one piece of frequency domain location information corresponds to one resource group of the N resource groups.

A signaling receiving device is provided according to another embodiment of the present disclosure. The device includes a receiving module, which is configured to receive an indication signaling transmitted by a network-side device. The indication signaling carries indication information for indicating a first parameter set and/or a second parameter set determined by the network-side device for N resource groups. The first parameter set is a Physical Downlink Shared Channel Resource Element (PDSCH RE) mapping set. The second parameter set is a quasi-co-location (QCL) parameter set. N is a positive integer greater than 1.

In one implementation mode, the N resource groups are obtained by dividing according to at least one of the following resources: a transmission block (TB), a codeword, a de-Modulation Reference Signal (DMRS) port group, a transport layer group (LG) and frequency domain location information.

In one implementation mode, one transmission block corresponds to one resource group of the N resource groups, or one codeword corresponds to one resource group of the N resource groups, or one DMRS port group corresponds to one resource group of the N resource groups, or one transport layer group corresponds to one resource group of the N resource groups or one piece of frequency domain location information corresponds to one resource group of the N resource groups.

A network-side device is provided according to another embodiment of the present disclosure, including the above-mentioned signaling transmitting device.

A terminal is provided according to another embodiment of the present disclosure, including the above-mentioned signaling receiving device.

A storage medium is provided according to another embodiment of the present disclosure. The storage medium stores computer-executable instructions which are configured to execute program codes of the following steps: determining a first parameter set and/or a second parameter set for N resource groups, where N is a positive integer greater than 1, the first parameter set is a Physical Downlink Shared Channel Resource Element (PDSCH RE) mapping set, the second parameter set is a Quasi-Co-Location (QCL) parameter set; and transmitting an indication signaling, where the indication signaling carries indication information for indicating the first parameter set and/or the second parameter set.

According to the embodiments of the present disclosure, a first parameter set and/or a second parameter set for N resource groups is determined and the determined first parameter set and/or second parameter set is transmitted to the terminal by an indication signaling, where N is a positive integer greater than 1, the first parameter set is a PDSCH RE mapping set and the second parameter set is a QCL parameter set. This can improve the performance in the joint transmission of the coordinated multi-point transmission caused by the Physical Downlink Shared Channel Resource Element and/or Quasi-Co-Location Indicator in the related art.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment One

The embodiment of the present disclosure may be implemented on a network structure shown in FIG. 1. As shown in FIG. 1, the network structure includes transmission nodes TP1, TP2 and a terminal. TP1 and TP2 transmit data to the terminal. It is to be noted that the network structure may include multiple transmission nodes, and is not limited to two.

Figure 2:
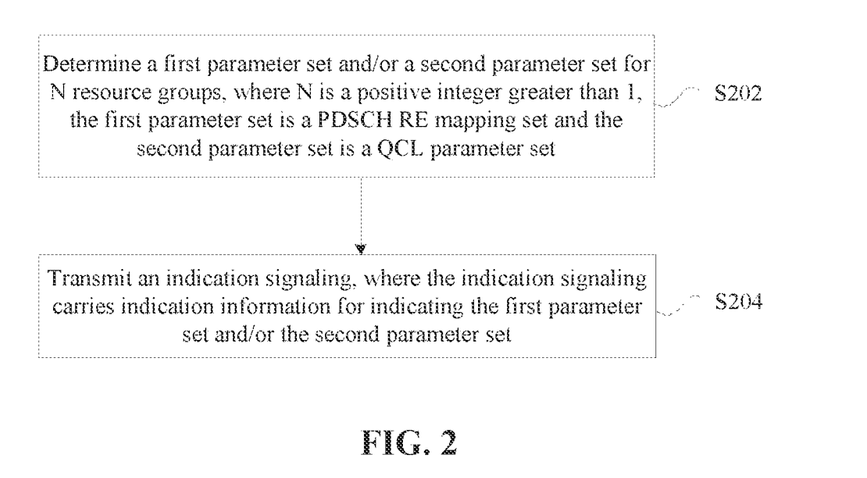
FIG. 2 is a flowchart of a signaling transmitting method according to an embodiment of the present disclosure.

A signaling transmitting method executing on the network structure is provided in this embodiment. FIG. 2 is a flowchart of a signaling transmitting method according to an embodiment of the present disclosure. As shown in FIG. 2, the process of the method includes steps described below.

In step S202, a first parameter set and/or a second parameter set is determined for N resource groups; where N is a positive integer greater than 1, the first parameter set is a Physical Downlink Shared Channel Resource Element (PDSCH RE) mapping set, the second parameter set is a Quasi-Co-Location (QCL) parameter set.

In step S204, an indication signaling is transmitted; where the indication signaling carries indication information for indicating the first parameter set and/or the second parameter set.

In above-mentioned steps, the first parameter set and/or the second parameter set is determined for N resource groups and then is transmitted to the terminal through indication signaling; where N is a positive integer greater than 1, the first parameter set is the PDSCH RE mapping set and the second parameter set is the QCL parameter set. Compared with the determination of the first parameter set and/or the second parameter set for only one resource group in the related art, the present disclosure improves the performance of the joint transmission.

It is to be noted that the N resource groups are obtained by dividing according to at least one of the following resources: a transmission block, a codeword, a de-Modulation Reference Signal (DMRS) port group, a transport layer group and frequency domain location information. The DMRS port group may include one or more DMRS ports. The frequency domain location information may include, but is not limited to, at least one of: resource block (RB) set information or sub-band set information.

It is to be noted that the division may be, but is not limited to, at least one of the followings: one transmission block corresponds to one resource group of the N resource groups, or one codeword corresponds to one resource group of the N resource groups, or one DMRS port group corresponds to one resource group of the N resource groups, one transport layer group corresponds to one resource group of the N resource groups and one piece of frequency domain location information corresponds to one resource group of the N resource groups.

Illustration is provided with following examples. (1) dividing by the TB, for example, TB1 is one resource group, TB2 is one resource group, the TBs may be organized in the form of data packets transmitted from a Media Access Control (MAC) to a physical layer in a LTE protocol; (2) dividing by the CW, for example, CW1 is one resource group, CW2 is one resource group, the codeword may be a data stream obtained in the LTE protocol after performing Cyclic Redundancy Code (CRC) check insertion and code block division on data in the TBs and performing CRC insertion, channel encoding and rate matching on each code block, and each codeword stream corresponds to one TB; (3) dividing by LG, for example, Layer group 1 (LG1) is one resource group, Layer group 2 (LG2) is one resource group, a complex symbol obtained from scrambling and modulation of the codeword in the LTE will be mapped onto one or more transmission layers through layer mapping; one transmission layer group includes one or more layers. when the number of layers changes, the group division method may also change; for example, in the case of two layers, LG1={Layer1} and LG2={Layer 2}; in the case of three layers, LG1={Layer 1} and LG2={Layer 2, Layer 3}; in the case of four layers, LG1={Layer 1, Layer 2} and LG2={Layer 3, Layer 4}; (4) dividing by the DMRS port group, for example, a DMRS port group 1 (DMRSG1) is one resource group, Layer group 2 (DMRSG2) is one resource group, the number of DMRS ports is related to the layer number of the transmission, the group division is related to the number of ports; for example, in the case of two DMRS ports, DMRSG1={port 7} and DMRSG2={port 8}; in the case of three ports, DMRSG1={port 7, port8} and DMRSG2={port 9}; in the case of four ports, DMRSG1={port 7, port8} and DMRSG2={port 9, port10}; (5) dividing by the frequency domain location information, for example, the Physical Resource Blocks (PRBs) of a PRB index set 1 are one resource group, and the PRBs of a PRB index set 2 are one resource group; the division of the PRB index set 1 and the PRB index set 2 includes, but is not limited to: the PRB index set 1 is {1~Nrb1}, the PRB index set 2 is {1+Nrb1~NRB}, where NRB is the number of RBs in the system bandwidth, for example, the number of RBs in a 10M system bandwidth is 50, Nrb1 is an integer less than NRB; the division may also be performed according to a sub-band, the RBs included in a sub-band set 1 is one resource group, the RBs included in a sub-band set 2 is one resource group, the sub-band is a RB set including multiple RBs.

In one embodiment of the present disclosure, each resource group corresponds to one first parameter set and/or second parameter set.

In one embodiment of the present disclosure, the indication signaling may include: a high layer signaling and/or a physical layer signaling. The high layer signaling is used for indicating parameter configuration information of the first parameter set and/or second parameter set. The high layer signaling or the physical layer signaling is used for indicating the first parameter set and/or second parameter set.

It is to be noted that the indication signaling may also be called a downlink signaling or a downlink control signaling, and is not limited thereto.

In one embodiment of the present disclosure, the indication signaling may include N first downlink signalings. The N first downlink signalings are used for indicating N first parameter sets and/or second parameter sets determined for the N resource groups respectively. That is, the N first downlink signalings are used for indicating N first parameter sets and/or second parameter sets respectively.

It is to be noted that the N first parameter sets and/or second parameter sets may be independent of each other, but is not limited thereto.

It is to be noted that determining the N first parameter sets and/or N second parameter sets for the N resource groups is determining N parameter sets for the N resource groups. Each parameter set includes one first parameter set and one second parameter set. The determined N first parameter sets may be the same or the determined N second parameter sets may be the same.

In one embodiment of the present disclosure, when the N first parameter sets may be same, the N second parameter sets may be different. When the N second parameter sets may be same, the N first parameter sets may be different. In this way, different parameter sets are determined for the N resource sets. Compared with the related art in which the parameter sets are the same, different CSI-RSs or CRSs may also be obtained when the same DMRSs are possessed, so that different CSI-RSs or CRSs are adopted to perform channel measurement, channel conditions of different transmission nodes or base stations are reflected, and the performance of the joint transmission is improved.

It is to be noted that the N second parameter sets may be different, and may be represented as: at least one parameter in the N second parameter sets is different. The N first parameter sets may be different, and may be represented as: at least one parameter in the N first parameter sets is different.

In one embodiment of the present disclosure, the indication signaling may include one first downlink signaling. The one first downlink signaling is used for indicating N first parameter sets and/or second parameter sets determined for the N resource groups.

It is to be noted that the N second parameter sets at least include parameter information of N quasi-co-location NZP CSI-RSs corresponding to the N resource groups and/or parameter information of N CRSs. That is, one QCL parameter set has N sets of CRS parameter sets and/or N sets of CSI-RS parameter sets. One CRS parameter set of the N sets of CRS parameter sets corresponds to CRS parameters of resource group 1 to resource group N. One CSI-RS parameter set of the N sets of CSI-RS parameter sets corresponds to CSI-RS parameters of the resource group 1 to resource group N.

In this embodiment, CSI-RS and/or CRS parameters are added in the QCL parameter sets, so that N different parameter sets can be indicated using one first downlink signaling.

In one embodiment of the present disclosure, the indication signaling may include one first downlink signaling and N−1 second downlink signalings. The one first downlink signaling is used for indicating one first parameter set and/or second parameter set of N first parameter sets and/or second parameter sets determined for the N resource groups. One of the N−1 second downlink signalings is used for indicating the one first parameter set and/or second parameter set of the N first parameter sets and/or second parameter sets determined for the N resource groups.

It is to be noted that the one first downlink signaling may be, but is not limited to, at least one of the following signalings: a high layer signaling, a PDSCH RE mapping set and a PQI. The N−1 second downlink signalings may also be PQIs or high layer signalings, but may also be other downlink signalings, and are not limited thereto.

In the above-mentioned embodiment, N−1 second downlink signalings are provided in addition to the one first downlink signaling to indicate parameter sets corresponding to different resource groups together, the performance of the joint transmission is improved.

In one implementation mode, the entity implementing the above steps may be a network-side device. The network-side device may be a transmission node or a base station. The transmission node or the base station includes, but is not limited to: a transmission node, a base station, a macro base station, a micro base station, a small home base station, a wireless hotspot, a wireless remote and a relay.

Figure 3:
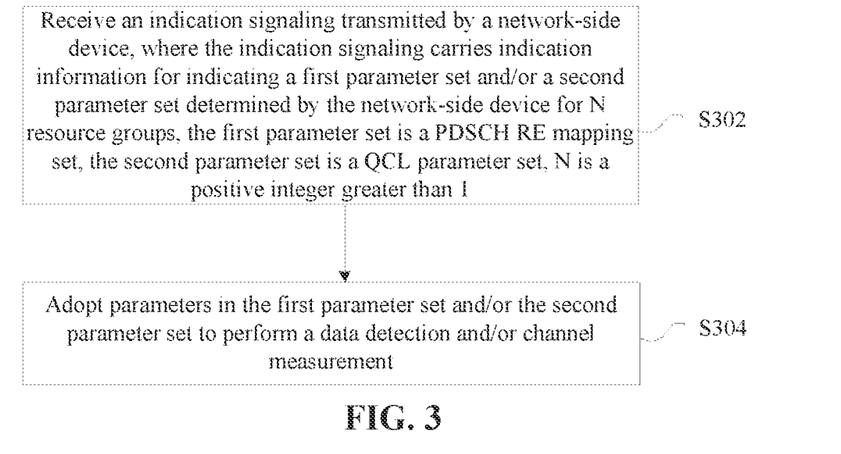
FIG. 3 is a flowchart of a signaling receiving method according to an embodiment of the present disclosure.

A signaling receiving method executing on the network structure shown in FIG. 1 is further provided in this embodiment. FIG. 3 is a flowchart of a signaling receiving method according to an embodiment of the present disclosure. As shown in FIG. 3, the process of the method includes steps described below.

In step S302, an indication signaling transmitted by a network-side device is received. The indication signaling carries indication information for indicating a first parameter set and/or a second parameter set determined by the network-side device for N resource groups. The first parameter set is a Physical Downlink Shared Channel Resource Element (PDSCH RE) mapping set. The second parameter set is a quasi-co-location (QCL) parameter set. N is a positive integer greater than 1.

In step S304, parameters in the first parameter set and/or the second parameter set are adopted to perform data detection and/or channel measurement.

In above-mentioned steps, the received indication signaling carries the indication information for indicating the first parameter set and/or a second parameter set determined by the network-side device for N resource groups, the first parameter set is a PDSCH RE mapping set, the second parameter set is a QCL parameter set, and N is a positive integer greater than 1. Compared with the determination of the first parameter set and/or the second parameter set for only one resource group in the related art, the present disclosure improves the performance of the joint transmission.

It is to be noted that the step S302 may be executed independently, and may also be executed with the step S304.

It is to be noted that the N resource groups are obtained by dividing according to at least one of the following resources: a transmission block, a codeword, a de-Modulation Reference Signal (DMRS) port group, a transport layer group and frequency domain location information. The DMRS port group may include one or more DMRS ports. The frequency domain location information may include at least one of: resource block (RB) set information or sub-band set information. The time domain location information may include at least one of: offset information indication information, subframe set indication information or signal set indication information.

It is to be noted that the division may be, but is not limited to, at least one of the followings: one transmission block corresponds to one resource group of the N resource groups, or one codeword corresponds to one resource group of the N resource groups, or one DMRS port group corresponds to one resource group of the N resource groups, one transport layer group corresponds to one resource group of the N resource groups and one piece of frequency domain location information corresponds to one resource group of the N resource groups.

Each resource group corresponds to one first parameter set and/or second parameter set.

In one embodiment of the present disclosure, the indication signaling may include: a high layer signaling and/or a physical layer signaling. The high layer signaling is used for indicating parameter configuration information of the first parameter set and/or second parameter set. The high layer signaling or the physical layer signaling is used for indicating the first parameter set and/or second parameter set.

It is to be noted that the indication signaling may also be called a downlink signaling or a downlink control signaling, and is not limited thereto.

In one embodiment of the present disclosure, the indication signaling may include N first downlink signalings. The N first downlink signalings are used for indicating N first parameter sets and/or second parameter sets determined for the N resource groups respectively. That is, the N first downlink signalings are used for indicating N first parameter sets and/or second parameter sets respectively.

It is to be noted that the N first parameter sets and/or second parameter sets may be independent of each other, but is not limited thereto.

It is to be noted that determining N first parameter sets and/or N second parameter sets for the N resource groups is determining N parameter sets for the N resource groups. Each parameter set includes one first parameter set and one second parameter set. The determined N first parameter sets may be the same or the determined N second parameter sets may be the same.

In one embodiment of the present disclosure, when the N first parameter sets may be same, the N second parameter sets may be different. When the N second parameter sets may be same, the N first parameter sets may be different. In this way, different parameter sets are determined for the N resource sets. Compared with the related art in which the parameter sets are the same, different CSI-RSs or CRSs may also be obtained when the same DMRSs are possessed, so that different CSI-RSs or CRSs are adopted to perform channel measurement, channel conditions of different transmission nodes or base stations are reflected, and the performance of the joint transmission is improved.

It is to be noted that the N second parameter sets may be different, and may be represented as: at least one parameter in the N second parameter sets is different. The N first parameter sets may be different, and may be represented as: at least one parameter in the N first parameter sets is different.

In one embodiment of the present disclosure, the indication signaling may include one first downlink signaling. The one first downlink signaling is used for indicating N first parameter sets and/or second parameter sets determined for the N resource groups.

It is to be noted that the N second parameter sets at least include parameter information of N quasi-co-location NZP CSI-RSs corresponding to the N resource groups and/or parameter information of N CRSs. That is, one QCL parameter set has N sets of CRS parameter sets and/or N sets of CSI-RS parameter sets. One CRS parameter set of the N sets of CRS parameter sets corresponds to CRS parameters of resource group 1 to resource group N. One CSI-RS parameter set of the N sets of CSI-RS parameter sets corresponds to CSI-RS parameters of the resource group 1 to resource group N.

In this embodiment, CSI-RS and/or CRS parameters are added in the QCL parameter sets, so that N different parameter sets can be indicated using one first downlink signaling.

In one embodiment of the present disclosure, the indication signaling may include one first downlink signaling and N−1 second downlink signalings. The one first downlink signaling is used for indicating one first parameter set and/or second parameter set of N first parameter sets and/or second parameter sets determined for the N resource groups. One of the N−1 second downlink signalings is used for indicating the one first parameter set and/or second parameter set of the N first parameter sets and/or second parameter sets determined for the N resource groups.

It is to be noted that the one first downlink signaling may be a PQI or a high layer signaling. The N−1 second downlink signalings may also be PQIs or high layer signalings, but may also be other downlink signalings, and are not limited thereto.

In the above-mentioned embodiment, N−1 second downlink signalings are provided in addition to the one first downlink signaling to indicate parameter sets corresponding to different resource groups together, the performance of the joint transmission is improved.

In one implementation mode, the entity implementing the above steps may be a terminal, but is not limited to a mobile terminal and a computer terminal, such as a data card, a mobile phone, a tablet computer, a laptop, a personal computer, a tablet, a personal digital assistant, a Bluetooth and other various receiving devices.

To better understand the present disclosure, the present disclosure will be further described below in conjunction with preferred embodiments.

The transmission node or the base station referred in the preferred embodiment of the present disclosure includes, but is not limited to: a base station, a macro base station, a micro base station, a small home base station, a wireless hotspot, a wireless remote and a relay.

To facilitate description, a communication system of the embodiment is described here. The communication system includes N (N=2) coordinated transmission nodes (TP1 and TP2). N transmission nodes are provides with Nt transmission antennas. Nt is a positive integer greater than or equal to 1. Here, the number of transmission antennas of each communication node may be different. N may be greater than 2. In this embodiment, N=2 for an example to facilitate description, similar extensions for cases of N>2 may be performed. At least one transmission node of the N transmission nodes transmits the PDSCH to the terminal on the same time-frequency resources. Meanwhile, in order to enable the terminal to perform detection on received data, a DMRS with the same precoding with the PDSCH needs to be transmitted and used for channel estimation. The detection of the PDSCH is performed with the estimated channel. To enable the terminal to perform a time offset and frequency offset estimation and to perform measurement of a channel quality, the transmission nodes need to transmit a CSI-RS or a CRS. Since nodes for the coordinated transmission is transparent to the user, the user does not need to know that data is transmitted by which transmission node. The base station only needs to notify the user that a transmitted and notified CSI-RS and/or CRS of current data and a transmitted and notified CSI-RS and/or CRS of the user DMRS have a quasi-co-location relationship. The CSI-RSs transmitted and notified by these two have approximately the same large-scale characteristics of the channel and approximately come from a same transmission node. For example, the TP1 optionally transmits one or more signals of the PDSCH1/DMRS1/CSI-RS1/CRS1, and the TP1 optionally transmits one or more signals of the PDSCH2/DMRS2/CSI-RS2/CRS2.

The transmission nodes need to configure M=4 PDSCH RE mapping parameter sets and/or QCL parameter sets through the high layer signaling, and transmit configured parameter contents to the terminal through the high layer signaling, and by at least one DSCH RE mapping and PQI. The PQI is a parameter of a DCI format 2D in a physical layer signaling, including 2 bit used for indicating one set in the M=4 parameter sets. As shown in table 1, The terminal receiving the physical layer signaling and obtain a value of the PQI, thereby obtaining the PDSCH RE mapping parameter sets and/or QCL parameter sets. In this way, the CSI-RS and/or CRS corresponding to the DMRS of the received PDSCH is obtained and is used for performing channel detection.

Preferred Embodiment 1: Division of Resource Groups

The resource groups are obtained by dividing according to one or more of resources described below.

N resource groups are obtained by dividing according to the transmission block. For example, a TB1 is one resource group and a TB2 is one resource group. The transmission block may be an organized in the form of data packets transmitted from a Media Access Control (MAC) to a physical layer in a LTE protocol.

N resource groups are obtained by dividing according to the codeword, for example, a CW1 is one resource group and a CW2 is one resource group. The codeword may be a data stream obtained in the LTE protocol after performing Cyclic Redundancy Code (CRC) insertion and code block division on data in the TBs and performing CRC insertion, channel encoding and rate matching on each code block. Each codeword stream corresponds to one TB.

N resource groups are obtained by dividing according to the transport layer group, for example, Layer group 1 (LG1) is one resource group, and Layer group 2 (LG2) is one resource group. A complex symbol obtained from scrambling and modulation of the codeword will be mapped onto one or more transmission layers through layer mapping. One transmission layer group includes one or more layers. When the number of layers changes, the group division method may also change. For example, in the case of two layers, LG1={Layer1} and LG2={Layer 2; in the case of three layers, LG1={Layer 1} and LG2={Layer 2, Layer 3}; in the case of four layers, LG1={Layer 1, Layer 2} and LG2={Layer 3, Layer 4}.

The N resource groups are obtained by dividing according to the DMRS port group. For example, a DMRS port group 1 (DMRSG1) is one resource group and Layer group 2 (DMRSG2) is one resource group. The number of DMRS ports is related to the layer number of the transmission. The group division is related to the number of ports. For example, in the case of two DMRS ports, DMRSG1={port 7} and DMRSG2={port 8}; in the case of three ports, DMRSG1={port 7, port8} and DMRSG2={port 9}; in the case of four ports, DMRSG1={port 7, port8} and DMRSG2={port 9, port10}.

The N resource groups are obtained by dividing according to the frequency domain location information. For example, Physical Resource Blocks (PRBs) of a PRB index set 1 are one resource group, and PRBs of a PRB index set 2 are one resource group. The division of the PRB index set 1 and the PRB index set 2 includes, but is not limited to: the PRB index set 1 is {1~Nrb1} and the PRB index set 2 is {1+Nrb1~NRB}. The NRB is the number of RBs in the system bandwidth. For example, the number of RBs in a 10M system bandwidth is 50, Nrb1 is an integer less than NRB. The PRB index set 1 and the PRB index set 2 may also be obtained by dividing according to a sub-band. The RBs included in a sub-band set 1 is one resource group and the RBs included in a sub-band set 2 is one resource group. The sub-band is a RB set including multiple RBs.

Preferred Embodiment 2: N PQIs

In this embodiment, a downlink control signaling transmitted by a base station includes values of the N PQIs. The user obtains the values of the N PQIs by receiving downlink control signaling and uses the values of the N PQIs to find parameter configuration in a PDSCH RE mapping set and parameter configuration in a QCL parameter set indicated by the values of the N PQIs. And the user determines and quasi-co-location information of a DMRS port and a CSI-RS/CRS according to the QCL parameter set.

Base station side:

(1) The base station determines N PDSCH RE mapping sets and/or Quasi-Co-Location parameter sets for information of N resource groups, where N>1.

Without loss of generality, assuming that N=2, similar extensions for other cases of N may be performed.

According to the division manner of resource groups in the embodiment one, N resource groups are obtained by dividing according to one or more of the following information:

a transmission block, a codeword, a de-Modulation Reference Signal (DMRS) port group, a transport layer group and frequency domain location information.

In a specific implementation process, the information may be the transmission block, the codeword, the de-Modulation Reference Signal (DMRS) port group, the transport layer group and frequency domain location information.

The base station configures M=4 quasi-co-location parameter sets: QCL Set0, QCL Set1, QCL Set2 and QCL Set3.

Each QCL parameter set includes values of the following parameters:

configuration parameter information of the CRS, including the number of ports and a parameter of frequency domain shift;

subframe configuration parameter information of a MBSFN;

parameter configuration information of a ZP CSI-RS;

configuration information of a data channel starting symbol parameter; and information of a quasi-co-location Non-Zero Power (NZP) CSI-RS.

For the sake of simplicity, the quasi-co-location Non-Zero Power CSI-RS is simplified into NZP CSI-RS.

For a more intuitive description, the values of different parameters in the parameter sets described above are specified as values of different parameters in the QCL parameter sets. Summary is shown in table 2.

TABLE 2

| QCL parameter set 1 | CRS pattern 1 | PDSCH starting position 1 | MBSFN Subframe config1 | NZP CSI-RS index 1 | ZP CSI-RS config 1 |
|---|---|---|---|---|---|
| QCL parameter set 2 | CRS pattern 2 | PDSCH starting position 2 | MBSFN Subframe config2 | NZP CSI-RS index 2 | ZP CSI-RS config 2 |
| QCL parameter set 3 | CRS pattern 3 | PDSCH starting position 3 | MBSFN Subframe config3 | NZP CSI-RS index 3 | ZP CSI-RS config 3 |
| QCL parameter set 4 | CRS pattern 4 | PDSCH starting position 4 | MBSFN Subframe config4 | NZP CSI-RS index 4 | ZP CSI-RS config 4 |

At least one parameter value of parameter values in each set of the four QCL parameter sets is different. For example, except that the CRS pattern mode has different values, other parameter values in the four sets are the same. Alternatively, for example, except that the NZP CSI-RS index has different values, other parameter values in the four sets are the same. Meanwhile, the base station configures four parameter sets related to the PDSCH RE mapping: PDSCH RE Set1 to PDSCH RE Set4, and combines the PDSCH RE parameter sets and the QCL parameter sets into four Physical Downlink Shared Channel Resource Element mapping sets and/or Quasi-Co-Location parameter sets. Each Physical Downlink Shared Channel Resource Element mapping set and/or Quasi-Co-Location parameter set includes one QCL parameter set and one PDSCH RE Set, and is indicated using a Physical Downlink Shared Channel Resource Element mapping and PQI. Each PQI includes 2 bits. Each value of the 2 bits indicates one set of the Physical Downlink Shared Channel Resource Element mapping sets and/or Quasi-Co-Location parameter sets.

The base station determines the Physical Downlink Shared Channel Resource Element mapping sets and/or Quasi-Co-Location parameter sets for a resource group 1 and a resource group 2. For example, the resource group 1 selects a Physical Downlink Shared Channel Resource Element mapping set and/or Quasi-Co-Location parameter set corresponding to PQI='00'. For example, the resource group 2 selects a Physical Downlink Shared Channel Resource Element mapping set and/or Quasi-Co-Location parameter set corresponding to PQI='01'. The resource groups may also select other POI values, and are not limited to the values in this embodiment.

According to different resources, one of the following cases is provided.

The CW1 corresponds to one PQI value, and the CW2 corresponds to one PQI value.

The LG1 corresponds to one PQI value, and the LG2 corresponds to one PQI value.

The DMRS port group DMRSG1 corresponds to one PQI value, and the DMRS port group DMRSG2 corresponds to one PQI value.

The RB of the frequency domain location information 1 corresponds to one PQI value and the RB of the frequency domain location information 2 corresponds to one PQI value.

(2) The base station transmits parameter configuration information of the Physical Downlink Shared Channel Resource Element mapping set and/or parameter configuration information of the Quasi-Co-Location parameter set by a high layer signaling, and transmits downlink control information. The downlink control information includes N pieces of PQI information. Each piece of PQI information indicates one set of the Physical Downlink Shared Channel Resource Element mapping sets and/or Quasi-Co-Location parameter sets.

For a terminal:

The terminal receives high layer physical information and a physical downlink control signaling transmitted by the base station. The terminal acquires parameter configuration of each PDSCH RE Set and parameter configuration of each QCL parameter set through the high layer signaling. According to the received downlink control signaling, the terminal acquires N pieces of PQI information. Each PQI indicates one PDSCH RE Set and one QCL parameter set. So that the terminal obtains that the quasi-co-location NZP CSI-RS configuration information and CRS information of the DMRS port of a codeword 1 in the PDSCH in the current subframe correspond to the NZP CSI-RS configuration information and CRS configuration information in the QCL parameter set corresponding to a first PQI, and the quasi-co-location NZP CSI-RS configuration information and CRS information of the DMRS port of a codeword 2 correspond to the NZP CSI-RS configuration information and CRS configuration information in the QCL parameter set corresponding to a second PQI.

It is to be noted that the PQI signaling in this embodiment may also be substituted with the high layer signaling. The high layer signaling indicates N different PDSCH RE sets or QCL sets, which have the same contents with the PQI table defined in this embodiment.

Preferred Embodiment 3: One PQI

In this embodiment, a downlink control signaling transmitted by the base station includes one PQI value. The user obtains the one PQI value by receiving the downlink control signaling and uses the one PQI value to find parameter configuration in a PDSCH RE mapping set indicated by the one PQI value and parameter configuration in a QCL parameter set. And the user determines a DMRS port and quasi-co-location information of a CSI-RS/CRS according to the QCL parameter set.

Base station side:

The base station determines N PDSCH RE mapping sets and/or Quasi-Co-Location parameter sets for information of N resource groups, N>1.

Without loss of generality, assuming that N=2, similar extensions for other cases of N may be performed.

According to the division manner of resource groups in the embodiment one, N resource groups are divided according to one or more of the following resources:

a transmission block, a codeword, a de-Modulation Reference Signal (DMRS) port group, a transport layer group and frequency domain location information In a specific implementation process, the information may be the transmission block, the codeword, the de-Modulation Reference Signal (DMRS) port group, the transport layer group and frequency domain location information.

The base station configures M=4 quasi-co-location parameter sets: QCL Set0, QCL Set1, QCL Set2 and QCL Set3.

Each QCL parameter set includes values of the following parameters:

configuration parameter information of one or more CRSs, including the number of ports and a parameter of frequency domain shift;

subframe configuration parameter information of a MBSFN;

parameter configuration information of a ZP CSI-RS;

configuration information of a data channel starting symbol parameter; and     information of one or more quasi-co-location Non-Zero Power (NZP) CSI-RSs.

For the sake of simplicity, the quasi-co-location Non-Zero Power CSI-RS is simplified into NZP CSI-RS.

For a more intuitive description, QCL parameters are written into tables. Different parameter values in the above parameter sets are summarized into table 3 to table 5 described below. The table 3 is the case where one QCL parameter set has a number N of CRS parameter sets. The table 4 is the case where one QCL parameter set has a number N of CSI-RS parameter sets. The table 5 is the case where one QCL parameter set has a number N of CRS parameter sets and a number N of CSI-RS parameter sets.

TABLE 3

| QCL parameter set 1 | CRS pattern 1 in resource group 1<br>CRS pattern 1 in resource group 2 | PDSCH starting position 1 | MBSFN Subframe config1 | NZP CSI-RS index 1 | ZP CSI-RS config 1 |

TABLE 3-continued

| QCL parameter set 2 | CRS pattern 2 in resource group 1 CRS pattern 2 in resource group 2 | PDSCH starting position 2 | MBSFN Subframe config2 | NZP CSI-RS index 2 | ZP CSI-RS config 2 |
|---|---|---|---|---|---|
| QCL parameter set 3 | CRS pattern 3 in resource group 1 CRS pattern 3 in resource group 2 | PDSCH starting position 3 | MBSFN Subframe config3 | NZP CSI-RS index 3 | ZP CSI-RS config 3 |
| QCL parameter set 4 | CRS pattern 4 in resource group 1 CRS pattern 4 in resource group 2 | PDSCH starting position 4 | MBSFN Subframe config4 | NZP CSI-RS index 4 | ZP CSI-RS config 3 |

TABLE 4

| QCL parameter set 1 | CRS pattern 1 | PDSCH starting position 1 | MBSFN Subframe config1 | NZP CSI-RS index 1 in resource group 1 NZP CSI-RS index 1 in resource group 2 | ZP CSI-RS config 1 |
|---|---|---|---|---|---|
| QCL parameter set 2 | CRS pattern 2 | PDSCH starting position 2 | MBSFN Subframe config2 | NZP CSI-RS index 2 in resource group 1 NZP CSI-RS index 2 in resource group 2 | ZP CSI-RS config 2 |
| QCL parameter set 3 | CRS pattern 3 | PDSCH starting position 3 | MBSFN Subframe config3 | NZP CSI-RS index 3 in resource group 1 NZP CSI-RS index 3 in resource group 2 | ZP CSI-RS config 3 |
| QCL parameter set 4 | CRS pattern 4 | PDSCH starting position 4 | MBSFN Subframe config4 | NZP CSI-RS index 4 in resource group 1 NZP CSI-RS index 4 in resource group 2 | ZP CSI-RS config 4 |

TABLE 5

| QCL parameter set 1 | CRS pattern 1 in resource group 1 CRS pattern 1 in resource group 2 | PDSCH starting position 1 | MBSFN Subframe config1 | NZP CSI-RS index 1 in resource group 1 NZP CSI-RS index 1 in resource group 2 | ZP CSI-RS config 1 |
|---|---|---|---|---|---|
| QCL parameter set 2 | CRS pattern 2 in resource group 1 CRS pattern 2 in resource group 2 | PDSCH starting position 2 | MBSFN Subframe config2 | NZP CSI-RS index 2 in resource group 1 NZP CSI-RS index 2 in resource group 2 | ZP CSI-RS config 2 |
| QCL parameter set 3 | CRS pattern 3 in resource group 1 CRS pattern 3 in resource group 2 | PDSCH starting position 3 | MBSFN Subframe config3 | NZP CSI-RS index 3 in resource group 1 NZP CSI-RS index 3 in resource group 2 | ZP CSI-RS config 3 |
| QCL parameter set 4 | CRS pattern 4 in resource group 1 CRS pattern 4 in resource group 2 | PDSCH starting position 4 | MBSFN Subframe config4 | NZP CSI-RS index 4 in resource group 1 NZP CSI-RS index 4 in resource group 2 | ZP CSI-RS config 4 |

At least one parameter value of parameter values in each set of the four QCL parameter sets is different. For example, except that values of a CRS pattern mode in resource group 1 and a CRS pattern mode in resource group 2 are different, other parameter values in the four sets are the same. Alternatively, for example, except that the NZP CSI-RS index has different values in the resource group 1 and the resource group 2 are different, other parameter values in the four sets are the same. Meanwhile, the base station configures four parameter sets related to the PDSCH RE mapping: PDSCH RE Set1 to PDSCH RE Set4, and combines the PDSCH RE parameter sets and the QCL parameter sets into four Physical Downlink Shared Channel Resource Element mapping sets and/or Quasi-Co-Location parameter sets. Each Physical Downlink Shared Channel Resource Element mapping set and/or Quasi-Co-Location parameter set includes one QCL parameter set and one PDSCH RE Set and is indicated using a Physical Downlink Shared Channel Resource Element mapping and PQI. Each PQI includes 2 bits. Each value of the 2 bits indicates one set of the Physical Downlink Shared Channel Resource Element mapping sets and/or Quasi-Co-Location parameter sets.

The base station determines Physical Downlink Shared Channel Resource Element mapping sets and/or Quasi-Co-Location parameter sets for a resource group 1 and a resource group 2. For example, the resource group 1 and the resource group 2 select a Physical Downlink Shared Channel Resource Element mapping set and/or Quasi-Co-Location parameter set corresponding to PQI='00'. The resource group 1 corresponds to a CRS parameter value in a CRS pattern 1 of the resource group 1 corresponding to PQI='00' and/or a NZP CSI-RS value in a NZP CSI-RS index 1 of the resource group 1. The resource group 2 corresponds to a CRS parameter value in a CRS pattern 1 of the resource group 2 corresponding to PQI='00' and/or a NZP CSI-RS value in a NZP CSI-RS index 1 of the resource group 2. Other parameters correspond to parameter values other than the CRS and NZP CSI-RS of the PQI='00'.

The PQI may have other values, and are not limited to the values in this embodiment.

According to different resources, the resource group 1 in this embodiment may be substituted with CW1, LG1, DMRS port group DMRSG1 or frequency domain location information 1. The resource group 2 may be substituted with CW2, LG2, DMRS port group DMRSG2 or frequency domain location information 2.

(2) The base station transmits parameter configuration information of the Physical Downlink Shared Channel Resource Element mapping set and/or parameter configuration information of the Quasi-Co-Location parameter set by a high layer signaling, and transmits downlink control information. The downlink control information includes one piece of PQI information. Each piece of PQI information indicates one set of the Physical Downlink Shared Channel Resource Element mapping sets and/or Quasi-Co-Location parameter sets. The Quasi-Co-Location parameter set includes N CSR parameter sets and/or N NZP CSI-RS parameters.

For a terminal:

The terminal receives high layer physical information and a physical downlink control signaling transmitted by the base station. The terminal acquires parameter configuration of each PDSCH RE Set and parameter configuration of each QCL parameter set through the high layer signaling. According to the received downlink control signaling, the terminal acquires one piece of PQI information. Each PQI indicates one PDSCH RE Set and one QCL parameter set. So that the terminal obtains that the quasi-co-location NZP CSI-RS configuration information and CRS information of the DMRS port of a codeword 1 in the PDSCH in the current subframe correspond to a CRS parameter value of the CRS pattern 1 in the resource group 1 of a QCL parameter group and/or a value of NZP CSI-RS of the NZP CSI-RS index 1 in the resource group 1, and the quasi-co-location NZP CSI-RS configuration information and CRS information of the DMRS port of a codeword 2 corresponds to a CRS parameter value of the CRS pattern 1 in the resource group 2 of a QCL parameter group and/or a value of NZP CSI-RS of the NZP CSI-RS index 1 in the resource group 2.

It is to be noted that the PQI signaling in this embodiment may also be substituted with the high layer signaling. The high layer signaling indicates N different PDSCH RE sets or QCL sets, which have the same contents with the PQI tables defined in this embodiment.

Preferred Embodiment 4: One PQI and N−1 Second Downlink Signalings

In this embodiment, a downlink control signaling transmitted by the base station includes values of the one PQI and the N−1 second downlink signalings. The user obtains the values of the one PQI and the N−1 second downlink signaling by receiving the downlink control signaling and uses the values of one PQI and the N−1 second downlink signaling to find parameter configuration in a PDSCH RE mapping set indicated by the values of one PQI and the N−1 second downlink signaling as well as parameter configuration in a QCL parameter set. And the user determines a DMRS port and quasi-co-location information of a CSI-RS/CRS according to the QCL parameter set.

Base station side:
The base station determines N PDSCH RE mapping sets and/or Quasi-Co-Location parameter sets for information of N resource groups, N>1.

Without loss of generality, assuming that N=2, similar extensions for other cases of N may be performed.

According to the division manner of resource groups in the embodiment one, N resource groups are divided according to one or more of the following resources:
a transmission block, a codeword, a de-Modulation Reference Signal (DMRS) port group, a transport layer group and frequency domain location information.

In a specific implementation process, the information may be the transmission block, the codeword, the de-Modulation Reference Signal (DMRS) port group, the transport layer group and frequency domain location information.

The base station configures M=4 quasi-co-location parameter sets: QCL Set0, QCL Set1, QCL Set2 and QCL Set3.

Each QCL parameter set includes values of the following parameters:
configuration parameter information of one CRS, including the number of ports and a parameter of frequency domain shift;
subframe configuration parameter information of a MBSFN;
parameter configuration information of a ZP CSI-RS;
configuration information of a data channel starting symbol parameter; and
information of one quasi-co-location Non-Zero Power (NZP) CSI-RS.

For the sake of simplicity, the quasi-co-location Non-Zero Power CSI-RS is simplified into NZP CSI-RS.

For a more intuitive description, QCL parameters are written into a table. Different parameter values in the above parameter sets are summarized into table 6 described below.

TABLE 6

| QCL parameter set 1 | CRS pattern 1 | PDSCH starting position 1 | MBSFN Subframe config1 | NZP CSI-RS index 1 | ZP CSI-RS config 1 |
|---|---|---|---|---|---|
| QCL parameter set 2 | CRS pattern 2 | PDSCH starting position 2 | MBSFN Subframe config2 | NZP CSI-RS index 2 | ZP CSI-RS config 2 |
| QCL parameter set 3 | CRS pattern3 | PDSCH starting position 3 | MBSFN Subframe config3 | NZP CSI-RS index 3 | ZP CSI-RS config 3 |
| QCL parameter set 4 | CRS pattern 4 | PDSCH starting position 4 | MBSFN Subframe config4 | NZP CSI-RS index 4 | ZP CSI-RS config 4 |

At least one parameter value of parameter values in each set of the four QCL parameter sets is different. For example, except that the CRS pattern has different values, other parameter values in the four sets are the same. Alternatively, for example, except that the NZP CSI-RS index value has different values, other parameter values in the four sets are the same. Meanwhile, the base station configures four parameter sets related to the PDSCH RE mapping: PDSCH RE Set1 to PDSCH RE Set4, and combines the PDSCH RE parameter sets and the QCL parameter sets into four Physical Downlink Shared Channel Resource Element mapping sets and/or Quasi-Co-Location parameter sets. Each Physical Downlink Shared Channel Resource Element mapping set and/or Quasi-Co-Location parameter set includes one QCL parameter set and one PDSCH RE Set and is indicated using a Physical Downlink Shared Channel Resource Element mapping and PQI. Each PQI includes 2 bits. Each value of the 2 bits indicates one set of the Physical Downlink Shared Channel Resource Element mapping sets and/or Quasi-Co-Location parameter sets.

The base station configures the N−1 second downlink control signalings, which are used for indicating parameter configuration of one CRS and/or parameter configuration of one NZP CSI-RS in the QCL.

The base station determines Physical Downlink Shared Channel Resource Element mapping sets and/or Quasi-Co-Location parameter sets for a resource group 1 and a resource group 2. For example, the resource group 1 selects a Physical Downlink Shared Channel Resource Element mapping set and/or Quasi-Co-Location parameter set corresponding to PQI='00', and the resource group 2 selects a Physical Downlink Shared Channel Resource Element mapping set and/or Quasi-Co-Location parameter set corresponding to PQI='01'. However, the CRS parameter configuration is substituted with the CRS parameter configuration indicated by a second downlink signaling 1 and/or the NZP CSI-RS parameter configuration is substituted with the NZP CSI-RS indicated by a second downlink signaling 1.

The PQI values may be other values, and are not limited to the values in this embodiment.

According to different resources, the resource group 1 in this embodiment may be substituted with CW1, LG1, DMRS port group DMRSG1 or frequency domain location information 1. The resource group 2 may be substituted with CW2, LG2, DMRS port group DMRSG2 or frequency domain location information 2.

(2) The base station transmits parameter configuration information of the Physical Downlink Shared Channel Resource Element mapping set and/or parameter configuration information of the Quasi-Co-Location parameter set through a high layer signaling, and transmits downlink control information. The downlink control information includes one pieces of PQI information. Each piece of PQI information indicates one set of the Physical Downlink Shared Channel Resource Element mapping sets and/or Quasi-Co-Location parameter sets, and also includes N−1 second downlink control signalings. The N−1 second downlink control signaling are used for indicating parameter configuration of one CRS and/or parameter configuration of one NZP CSI-RS in the QCL.

For a terminal:

The terminal receives high layer physical information and a physical downlink control signaling transmitted by the base station. The terminal acquires parameter configuration of each PDSCH RE Set and parameter configuration of each QCL parameter set through the high layer signaling. According to the received downlink control signaling, the terminal acquires one piece of PQI information and the N−1 second downlink control signalings. Each PQI indicates one PDSCH RE Set and one QCL parameter set. So that the terminal obtains that the quasi-co-location NZP CSI-RS configuration information and CRS information of the DMRS port of a codeword 1 in the PDSCH in the current subframe correspond to the NZP CSI-RS configuration information and CRS configuration information in the QCL parameter set corresponding to the PQI, and the quasi-co-location NZP CSI-RS configuration information and CRS information of the DMRS port of a codeword 2 correspond to the NZP CSI-RS configuration information and CRS configuration information corresponding to the second downlink control signalings.

It is to be noted that the PQI signaling in this embodiment may also be substituted with the high layer signaling. The high layer signaling indicates N different PDSCH RE sets or QCL sets, which have the same contents with the PQI table defined in this embodiment.

Preferred Embodiment 5: N Downlink Signalings being not PQI

In this embodiment, a downlink signaling transmitted by a base station includes N downlink signalings, such as high layer signaling or other downlink physical control signaling different from a PQI. The user obtains values of the N downlink signalings by receiving the N downlink signalings and uses the values of the N downlink signalings to find parameter configuration in a QCL parameter set indicated by the values of the N downlink signaling. And the user determines a DMRS port and quasi-co-location information of a CSI-RS/CRS according to the QCL parameter set.

Base station side:

The base station determines N PDSCH RE mapping sets and/or Quasi-Co-Location parameter sets for information of N resource groups, N>1.

Without loss of generality, assuming that N=2, similar extensions for other cases of N may be performed.

According to the division manner of resource groups in the embodiment one, N resource groups are divided according to one or more of the following resources:

a transmission block, a codeword, a de-Modulation Reference Signal (DMRS) port group, a transport layer group and frequency domain location information. In a specific implementation process, the information may be the transmission block, the codeword, the de-Modulation Reference Signal (DMRS) port group, the transport layer group and frequency domain location information.

The base station configures M=4 quasi-co-location parameter sets: QCL Set0, QCL Set1, QCL Set2 and QCL Set3.

Each QCL parameter set includes values of the following parameters:

configuration parameter information of the CRS, including the number of ports and a parameter of frequency domain shift;

subframe configuration parameter information of a MBSFN;

parameter configuration information of a ZP CSI-RS;

configuration information of a data channel starting symbol parameter; and information of a quasi-co-location Non-Zero Power (NZP) CSI-RS.

For the sake of simplicity, the quasi-co-location Non-Zero Power CSI-RS is simplified into NZP CSI-RS.

For a more intuitive description, the values of different parameters in the parameter sets described above are specified as values of different parameters in the QCL parameter sets. Summary is shown in table 7.

TABLE 7

| QCL parameter set 1 | CRS pattern 1 | PDSCH starting position 1 | MBSFN Subframe config1 | NZP CSI-RS index 1 | ZP CSI-RS config 1 |
| QCL parameter set 2 | CRS pattern 2 | PDSCH starting position 2 | MBSFN Subframe config2 | NZP CSI-RS index 2 | ZP CSI-RS config 2 |
| QCL parameter set 3 | CRS pattern 3 | PDSCH starting position 3 | MBSFN Subframe config3 | NZP CSI-RS index 3 | ZP CSI-RS config 3 |
| QCL parameter set 4 | CRS pattern 4 | PDSCH starting position 4 | MBSFN Subframe config4 | NZP CSI-RS index 4 | ZP CSI-RS config 4 |

At least one parameter value of parameter values in each set of the four QCL parameter sets is different. For example, except that the CRS pattern mode has different values, other parameter values in the four sets are the same. Alternatively, for example, except that the NZP CSI-RS index has different values, other parameter values in the four sets are the same.

The base station configures one downlink signaling D, which includes a high layer signaling or a physical signaling. The downlink signaling is not a PQI signaling. The downlink signaling includes 2 bits used for indicating four QCL parameter sets. For example, the downlink signaling D has a value '00' corresponding to a Set0, a value '01' corresponding to a Set1, a value '10' corresponding to a Set2 and a value '11' corresponding to a Set3.

The base station determines Quasi-Co-Location parameter sets for a resource group 1 and a resource group 2. For example, the resource group 1 selects the Set0 corresponding to D='00'. For example, the resource group 2 selects the Set1 corresponding to D='01'. The values of the downlink signaling D the corresponding to different resource groups may also be other values, and are not limited to the values in this embodiment.

According to different resources, one of the following cases is provided.

The CW1 corresponds to one downlink signaling D value, and the CW2 corresponds to one downlink signaling D value.

The LG1 corresponds to one downlink signaling D value, and the LG2 corresponds to one downlink signaling D value.

The DMRS port group DMRSG1 corresponds to one downlink signaling D value, and the DMRS port group DMRSG2 corresponds to one downlink signaling D value.

The RB of the frequency domain location information 1 corresponds to one downlink signaling D value and the RB of the frequency domain location information 2 corresponds to one downlink signaling D value.

(2) The base station transmits parameter configuration information in the Quasi-Co-Location parameter set through the high layer signaling, and transmits downlink control information. The downlink control information includes N downlink signalings D. Each downlink signaling D indicates one set in one Quasi-Co-Location parameter set.

For a terminal:

The terminal receives high layer physical information and a physical downlink control signaling transmitted by the base station. The terminal acquires parameter configuration of each QCL parameter set through the high layer signaling. According to the received downlink control signaling, the terminal acquires information of the N downlink signalings D. Each downlink signaling D indicates one PDSCH RE Set and one QCL parameter set. So that the terminal obtains that the quasi-co-location NZP CSI-RS configuration information and CRS information of the DMRS port of a codeword 1 in the PDSCH in the current subframe correspond to the NZP CSI-RS configuration information and CRS configuration information in the QCL parameter set corresponding to a first PQI, and the quasi-co-location NZP CSI-RS configuration information and CRS information of the DMRS port of a codeword 2 correspond to the NZP CSI-RS configuration information and CRS configuration information in the QCL parameter set corresponding to a second PQI.

It is to be noted that the QCL parameter set in this embodiment may also be substituted with the PDSCH RE mapping set, and may also be substituted with the PDSCH RE mapping set and the QCL parameter set. The implementation process is similar to the process which only has the QCL parameter set, and repetition will not be made here.

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on this understanding, the present disclosure substantially, or the part contributing to the related art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to embodiments of the present disclosure.

Embodiment Two

A signaling transmitting device is further provided in this embodiment. The device is used for implementing the above-mentioned embodiments and preferred implementation modes. What has been described will not be repeated.

As used below, a term "module" may be software, hardware or a combination thereof capable of implementing predetermined functions. The device in the embodiments described below is preferably implemented by software, but implementation by hardware or by a combination of software and hardware is also possible and conceived.

Figure 4:
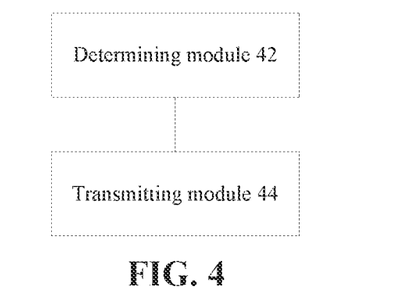
FIG. 4 is a block diagram of a signaling transmitting device according to an embodiment of the present disclosure.

FIG. 4 is a block diagram of signaling transmitting device according to an embodiment of the present disclosure. As shown in FIG. 4, the device includes a determining module 42 and a transmitting module 44.

The determining module 42 is configured to determine a first parameter set and/or second parameter set for N resource groups, N is a positive integer greater than 1, the first parameter set is a PDSCH RE mapping set, the second parameter set is a QCL parameter set; and The transmitting module 44 is connected to the determining module 42 and configured to transmit an indication signaling, the indication signaling carries indication information for indicating the first parameter set and/or the second parameter set.

According to above-mentioned device, the first parameter set and/or the second parameter set is determined for N resource groups and then is transmitted to the terminal through indication signaling; where N is a positive integer greater than 1, the first parameter set is the PDSCH RE mapping set and the second parameter set is the QCL parameter set. Compared with the determination of the first parameter set and/or the second parameter set for only one resource group in the related art, the present disclosure improves the performance of the joint transmission.

It is to be noted that the N resource groups are obtained by dividing according to at least one of the following resources: a transmission block, a codeword, a de-Modulation Reference Signal (DMRS) port group, a transport layer group and frequency domain location information. The DMRS port group may include one or more DMRS ports. The frequency domain location information may include, but is not limited to at least one of: resource block (RB) set information or sub-band set information.

It is to be noted that the division may be, but is not limited to, at least one of the followings: one transmission block corresponds to one resource group of the N resource groups, or one codeword corresponds to one resource group of the N resource groups, or one DMRS port group corresponds to one resource group of the N resource groups, one transport layer group corresponds to one resource group of the N resource groups and one piece of frequency domain location information corresponds to one resource group of the N resource groups.

In one embodiment of the present disclosure, each resource group corresponds to one first parameter set and/or second parameter set.

In one embodiment of the present disclosure, the indication signaling may include: a high layer signaling and/or a physical layer signaling. The high layer signaling is used for indicating parameter configuration information of the first parameter set and/or second parameter set. The high layer signaling or the physical layer signaling is used for indicating the first parameter set and/or second parameter set.

It is to be noted that the indication signaling may also be called a downlink signaling or a downlink control signaling, and is not limited thereto.

In one embodiment of the present disclosure, the indication signaling may include N first downlink signalings. The N first downlink signalings are used for indicating N first parameter sets and/or parameter sets determined for the N resource groups respectively. That is, the N first downlink signalings are used for indicating N first parameter sets and/or second parameter sets respectively.

It is to be noted that the N first parameter sets and/or second parameter sets may be independent of each other, but is not limited thereto.

It is to be noted that determining the N first parameter sets and/or N second parameter sets for the N resource groups is determining N parameter sets for the N resource groups. Each parameter set includes one first parameter set and one second parameter set. The determined N first parameter sets may be the same or the determined N second parameter sets may be the same.

In one embodiment of the present disclosure, when the N first parameter sets may be same, the N second parameter sets may be different. When the N second parameter sets may be same, the N first parameter sets may be different. In this way, different parameter sets are determined for the N resource sets. Compared with the related art in which the parameter sets are the same, different CSI-RSs or CRSs may also be obtained when the same DMRSs are possessed, so that different CSI-RSs or CRSs are adopted to perform channel measurement, channel conditions of different transmission nodes or base stations are reflected, and the performance of the joint transmission is improved.

It is to be noted that the N second parameter sets may be different, and may be represented as: at least one parameter in the N second parameter sets is different. The N first parameter sets may be different, and may be represented as: at least one parameter in the N first parameter sets is different.

In one embodiment of the present disclosure, the indication signaling may include one first downlink signaling. The one first downlink signaling is used for indicating N first parameter sets and/or second parameter sets determined for the N resource groups.

It is to be noted that the N second parameter sets at least include parameter information of N quasi-co-location NZP CSI-RSs corresponding to the N resource groups and/or parameter information of N CRSs. That is, one QCL parameter set has N sets of CRS parameter sets and/or N sets of CSI-RS parameter sets. One CRS parameter set of the N sets of CRS parameter sets corresponds to CRS parameters of resource group 1 to resource group N. One CSI-RS parameter set of the N sets of CSI-RS parameter sets corresponds to CSI-RS parameters of the resource group 1 to resource group N.

In this embodiment, CSI-RS and/or CRS parameters are added in the QCL parameter sets, so that N different parameter sets can be indicated using one first downlink signaling.

In one embodiment of the present disclosure, the indication signaling may include one first downlink signaling and N−1 second downlink signalings. The one first downlink signaling is used for indicating one first parameter set and/or second parameter set of N first parameter sets and/or second parameter sets determined for the N resource groups. One of the N−1 second downlink signalings is used for indicating the one first parameter set and/or second parameter set of the N first parameter sets and/or second parameter sets determined for the N resource groups.

It is to be noted that the one first downlink signaling may be a PQI or a high layer signaling, but is not limited thereto. The N−1 second downlink signalings may also be PQIs or high layer signalings, but may also be other downlink signalings, and is not limited thereto.

In the above-mentioned embodiment, N−1 second downlink signalings are provided in addition to the one first downlink signaling to indicate parameter sets corresponding to different resource groups together, the performance of the joint transmission is improved.

It is to be noted that the signaling transmission device may be disposed in a network-side device. The network-side device may be a transmission node or a base station. The transmission node or the base station includes, but is not limited to: a base station, a macro base station, a micro base station, a small home base station, a wireless hotspot, a wireless remote and a relay.

Figure 5:
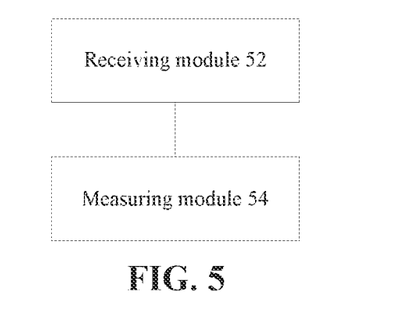
FIG. 5 is a block diagram of a signaling receiving device according to an embodiment of the present disclosure.

A signal receiving device is further provided in this embodiment. FIG. 5 is a block diagram of the signaling receiving device according to an embodiment of the present disclosure. As shown in FIG. 5, the device includes a receiving module 52 and a measuring module 54.

The receiving module 52 is configured to receive an indication signaling transmitted by a network-side device, the indication signaling carries indication information for indicating a first parameter set and/or a second parameter set determined by the network-side device for N resource groups, the first parameter set is a Physical Downlink Shared Channel Resource Element (PDSCH RE) mapping set, the second parameter set is a quasi-co-location (QCL) parameter set. N is a positive integer greater than 1; and The measuring module 54 is connected to the receiving module 52 and configured to adopt parameters in the first parameter set and/or the second parameter set to perform a data detection and/or channel measurement.

The above-mentioned device, the received indication signaling carries the indication information for indicating the first parameter set and/or a second parameter set determined by the network-side device for N resource groups, the first parameter set is a PDSCH RE mapping set, the second parameter set is a QCL parameter set, and N is a positive integer greater than 1. Compared with the determination of the first parameter set and/or the second parameter set for only one resource group in the related art, the present disclosure improves the performance of the joint transmission.

It is to be noted that the above-mentioned device may also only include the receiving module 52, but is not limited thereto.

It is to be noted that the N resource groups are obtained by dividing according to at least one of the following resources: a transmission block, a codeword, a de-Modulation Reference Signal (DMRS) port group, a transport layer group and frequency domain location information. The DMRS port group may include one or more DMRS ports. The frequency domain location information may include, but is not limited to at least one of: resource block (RB) set information or sub-band set information.

It is to be noted that the division may be, but is not limited to, at least one of the followings: one transmission block corresponds to one resource group of the N resource groups, or one codeword corresponds to one resource group of the N resource groups, or one DMRS port group corresponds to one resource group of the N resource groups, one transport layer group corresponds to one resource group of the N resource groups and one piece of frequency domain location information corresponds to one resource group of the N resource groups.

Each resource group corresponds to one first parameter set and/or second parameter set.

In one embodiment of the present disclosure, the indication signaling may include: a high layer signaling and/or a physical layer signaling. The high layer signaling is used for indicating parameter configuration information of the first parameter set and/or second parameter set. The high layer signaling or the physical layer signaling is used for indicating the first parameter set and/or second parameter set.

It is to be noted that the indication signaling may also be called a downlink signaling or a downlink control signaling, and is not limited thereto.

In one embodiment of the present disclosure, the indication signaling may include N first downlink signalings. The N first downlink signalings are used for indicating N first parameter sets and/or second parameter sets determined for the N resource groups respectively. That is, the N first downlink signalings are used for indicating N first parameter sets and/or second parameter sets respectively.

It is to be noted that the N first parameter sets and/or second parameter sets may be independent of each other, but is not limited thereto.

It is to be noted that determining the N first parameter sets and/or N second parameter sets for the N resource groups is determining N parameter sets for the N resource groups. Each parameter set includes one first parameter set and one second parameter set. The determined N first parameter sets may be the same or the determined N second parameter sets may be the same.

In one embodiment of the present disclosure, when the N first parameter sets may be same, the N second parameter sets may be different. When the N second parameter sets may be same, the N first parameter sets may be different. In this way, different parameter sets are determined for the N resource sets. Compared with the related art in which the parameter sets are the same, different CSI-RSs or CRSs may also be obtained when the same DMRSs are possessed, so that different CSI-RSs or CRSs are adopted to perform channel measurement, channel conditions of different transmission nodes or base stations are reflected, and the performance of the joint transmission is improved.

It is to be noted that the N second parameter sets may be different, may be represented as: at least one parameter in the N second parameter sets is different. The N first parameter sets may be different, and may be represented as: at least one parameter in the N first parameter sets is different.

In one embodiment of the present disclosure, the indication signaling may include one first downlink signaling. The one first downlink signaling is used for indicating N first parameter sets and/or second parameter sets determined for the N resource groups.

It is to be noted that the N second parameter sets at least include parameter information of N quasi-co-location NZP CSI-RSs corresponding to the N resource groups and/or parameter information of N CRSs. That is, one QCL parameter set has N sets of CRS parameter sets and/or N sets of CSI-RS parameter sets. One CRS parameter set of the N sets of CRS parameter sets corresponds to CRS parameters of resource group 1 to resource group N. One CSI-RS parameter set of the N sets of CSI-RS parameter sets corresponds to CSI-RS parameters of the resource group 1 to resource group N.

In this embodiment, CSI-RS and/or CRS parameters are added in the QCL parameter sets, so that N different parameter sets can be indicated using one first downlink signaling.

In one embodiment of the present disclosure, the indication signaling may include one first downlink signaling and N-1 second downlink signalings. The one first downlink signaling is used for indicating one first parameter set and/or second parameter set of N first parameter sets and/or second parameter sets determined for the N resource groups. One of the N-1 second downlink signalings is used for indicating the one first parameter set and/or second parameter set of the N first parameter sets and/or second parameter sets determined for the N resource groups.

It is to be noted that the one first downlink signaling may be a PQI or a high layer signaling, but is not limited thereto. The N-1 second downlink signalings may also be PQIs or high layer signalings, but may also be other downlink signalings, and are not limited thereto.

In the above-mentioned embodiment, N-1 second downlink signalings are provided in addition to the one first downlink signaling to indicate parameter sets corresponding to different resource groups together, the performance of the joint transmission is improved.

In one embodiment, the signaling transmission device in the above steps may be disposed in the terminal, but is not limited to a mobile terminal and a computer terminal, such as a data card, a mobile phone, a tablet computer, a laptop a personal computer, a tablet, a personal digital assistant, a Bluetooth and other various receiving devices.

It is to be noted that the various modules described above may be implemented by software or hardware. Implementation by hardware may, but may not necessarily, be performed by the following method: the various modules described above are located in a same processor or their respective processors in any combination.

Embodiment Three

A network-side device is further provided in this embodiment, including the signaling transmitting device as shown in FIG. 4. The network-side device may be a transmission node or a base station. The transmission node or the base station includes, tut is not limited to: a base station, a macro base station, a micro base station, a small home base station, a wireless hotspot, a wireless remote and a relay.

A terminal is further provided in this embodiment, including the signaling transmitting device as shown in FIG. 5. The terminal is not limited to a mobile terminal and a computer terminal.

For the signaling transmitting device shown in FIGS. 4 and 5, reference may be made to the description shown in the embodiment two, repetition will not be made in this embodiment.

Embodiment Four

A storage medium is further provided in an embodiment of the present disclosure. In this embodiment, the storage medium may be configured to store program codes for executing the steps of the signaling transmitting method in the embodiment one.

In one embodiment, in this embodiment, the storage medium may include, but is not limited to, a flash disk, a read-only memory (ROM), a random access memory (RAM), a mobile hard disk, a magnetic disk, an optical disk or another medium capable of storing program codes.

In one embodiment, for specific examples in this embodiment, reference may be made to the examples described in the above embodiments and optional implementation modes, and repetition will not be made in this embodiment.

Apparently, those skilled in the art should understand that each of the above-mentioned modules or steps of the present disclosure may be implemented by a general-purpose computing apparatus, the modules or steps may be concentrated on a single computing apparatus or distributed on a network formed by multiple computing apparatuses, and optionally, the modules or steps may be implemented by program codes executable by the computing apparatuses, so that modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

According to the present disclosure, a first parameter set and/or a second parameter set is determined for N resource groups and then is transmitted to the terminal through indication signaling; where N is a positive integer greater than 1, the first parameter set is a PDSCH RE mapping set and the second parameter set is a QCL parameter set. This can improve the performance of the joint transmission.

What is claimed is:

1. A signaling transmitting method, comprising
determining N parameter sets for N resource groups, wherein each of the N parameter sets comprises a first parameter set and/or second parameter set, N is a positive integer greater than 1, and the first parameter set is a Physical Downlink Shared Channel Resource Element (PDSCH RE) mapping set, and/or the second parameter set is a Quasi-Co-Location (QCL) parameter set; and
transmitting an indication signaling, wherein the indication signaling carries indication information for indicating the first parameter set and/or second parameter set;
wherein the N resource groups are obtained by dividing according to codewords corresponding to a PDSCH;
wherein the indication signaling comprises N first downlink signalings, wherein the N first downlink signalings are used for indicating N first parameter sets and second parameter sets of the N parameter sets determined for the N resource groups respectively, and the N first downlink signalings are N high-layer signalings; and
wherein the indication signaling comprises one first downlink signaling, wherein the one first downlink signaling is used for indicating the first parameter set and/or the second parameter set in each of the N parameter sets determined for the N resource groups, and the one first downlink signaling is one physical layer signaling.

2. The method according to claim 1, wherein one codeword corresponds to one resource group of the N resource groups.

3. The method according to claim 1, wherein each resource group of the N resource groups corresponds to one first parameter set and/or second parameter set.

4. The method according to claim 1, wherein the N resource groups are further obtained by dividing according to at least one of: a de-Modulation Reference Signal (DMRS) port group or frequency domain location information; and wherein the DMRS port group comprises one or more DMRS ports; the frequency domain location information comprises at least one of: resource block (RB) set information or sub-band set information.

5. The method according to claim 1, wherein the N resource groups are further obtained by dividing according to at least one of: a DMRS port group or frequency domain location information; wherein one DMRS port group corresponds to one resource group of the N resource groups, one piece of frequency domain location information corresponds to one resource group of the N resource groups.

6. A signaling receiving method, comprising
receiving an indication signaling transmitted by a network-side device; wherein the indication signaling carries indication information for indicating N parameter sets determined by the network-side device for N resource groups, wherein each of the N parameter sets comprises a first parameter set and/or second parameter set, N is a positive integer greater than 1, and the first parameter set is a Physical Downlink Shared Channel Resource Element (PDSCH RE) mapping set, and/or the second parameter set is a Quasi-Co-Location (QCL) parameter set;
wherein the N resource groups are obtained by dividing according to codewords corresponding to a PDSCH;
wherein the indication signaling comprises N first downlink signalings, wherein the N first downlink signalings are used for indicating N first parameter sets and second parameter sets of the N parameter sets determined for the N resource groups respectively, and the N first downlink signalings are N high-layer signalings; and
wherein the indication signaling comprises one first downlink signaling, wherein the one first downlink signaling is used for indicating the first parameter set and/or the second parameter set in each of the N parameter sets determined for the N resource groups, and the one first downlink signaling is one physical layer signaling.

7. The method according to claim 6, wherein one codeword corresponds to one resource group of the N resource groups.

8. The method according to claim 6, wherein each resource group of the N resource groups corresponds to one first parameter set and/or second parameter set.

9. The method according to claim 6, wherein the N resource groups are further obtained by dividing according to at least one of: a de-Modulation Reference Signal (DMRS) port group or frequency domain location information; and wherein the DMRS port group comprises one or more DMRS ports; the frequency domain location information comprises at least one of: resource block (RB) set information or sub-band set information.

10. The method according to claim 6, wherein the N resource groups are further obtained by dividing according to at least one of: a DMRS port group or frequency domain location information; wherein one DMRS port group corresponds to one resource group of the N resource groups, one piece of frequency domain location information corresponds to one resource group of the N resource groups.

11. A signaling transmitting device, comprising:
a processor; and
a memory for storing instructions executable by the processor,
wherein the processor is configured to:
determine N parameter sets for N resource groups, wherein each of the N parameter sets comprises a first parameter set and/or second parameter set, N is a positive integer greater than 1, and the first parameter set is a Physical Downlink Shared Channel Resource Element (PDSCH RE) mapping set, and/or the second parameter set is a quasi-co-location (QCL) parameter set; and transmit an indication signaling, wherein the indication signaling carries indication information for indicating the first parameter set and/or the second parameter set;

wherein the N resource groups are obtained by dividing according to codewords corresponding to a PDSCH;

wherein the indication signaling comprises N first downlink signalings, wherein the N first downlink signalings are used for indicating N first parameter sets and second parameter sets of the N parameter sets determined for the N resource groups respectively, and the N first downlink signalings are N high-layer signalings; and wherein the indication signaling comprises one first downlink signaling, wherein the one first downlink signaling is used for indicating the first parameter set and/or the second parameter set in each of the N parameter sets determined for the N resource groups, and the one first downlink signaling is one physical layer signaling.

12. The device according to claim 11, wherein one codeword corresponds to one resource group of the N resource groups.

13. The device according to claim 11, wherein each resource group of the N resource groups corresponds to one first parameter set and/or second parameter set.

14. The device according to claim 11, wherein the N resource groups are further obtained by dividing according to at least one of: a de-Modulation Reference Signal (DMRS) port group or frequency domain location information; and wherein the DMRS port group comprises one or more DMRS ports; the frequency domain location information comprises at least one of resource block (RB) set information or sub-band set information.

15. The device according to claim 11, wherein the N resource groups are further obtained by dividing according to at least one of: a DMRS port group or frequency domain location information; wherein one DMRS port group corresponds to one resource group of the N resource groups, one piece of frequency domain location information corresponds to one resource group of the N resource groups.

16. A signaling receiving device, comprising:
a processor; and
a memory for storing instructions executable by the processor,
wherein the processor is configured to:
receive an indication signaling transmitted by a network-side device; wherein the indication signaling carries indication information for indicating N parameter sets determined by the network-side device for N resource groups, wherein each of the N parameter sets comprises a first parameter set and/or second parameter set, N is a positive integer greater than 1, and the first parameter set is a Physical Downlink Shared Channel Resource Element (PDSCH RE) mapping set, and/or the second parameter set is a quasi-co-location (QCL) parameter set;

wherein the N resource groups are obtained by dividing according to codewords corresponding to the PDSCH;

wherein the indication signaling comprises N first downlink signalings, wherein the N first downlink signalings are used for indicating N first parameter sets and second parameter sets of the N parameter sets determined for the N resource groups respectively, and the N first downlink signalings are N high-layer signalings; and wherein the indication signaling comprises one first downlink signaling, wherein the one first downlink signaling is used for indicating the first parameter set and/or the second parameter set in each of the N parameter sets determined for the N resource groups, and the one first downlink signaling is one physical layer signaling.

17. The device according to claim 16, wherein one codeword corresponds to one resource group of the N resource groups.

18. The device according to claim 16, wherein each resource group of the N resource groups corresponds to one first parameter set and/or second parameter set.

19. The device according to claim 16, wherein the N resource groups are further obtained by dividing according to at least one of: a de-Modulation Reference Signal (DMRS) port group or frequency domain location information; and wherein the DMRS port group comprises one or more DMRS ports; the frequency domain location information comprises at least one of: resource block (RB) set information or sub-band set information.

20. The device according to claim 16, wherein the N resource groups are further obtained by dividing according to at least one of: a DMRS port group or frequency domain location information; wherein one DMRS port group corresponds to one resource group of the N resource groups, one piece of frequency domain location information corresponds to one resource group of the N resource groups.

* * * * *